(12) United States Patent
Valania

(10) Patent No.: US 7,619,515 B2
(45) Date of Patent: Nov. 17, 2009

(54) FIRST RESPONDER LOCALIZATION AND COMMUNICATION SYSTEM

(76) Inventor: Brian Valania, 417 W. High St., Painted Post, NY (US) 14870

( * ) Notice: Subject to any disclaimer, the term of this patent is extended or adjusted under 35 U.S.C. 154(b) by 357 days.

(21) Appl. No.: 11/635,126

(22) Filed: Dec. 6, 2006

(65) Prior Publication Data

US 2007/0126573 A1    Jun. 7, 2007

Related U.S. Application Data

(60) Provisional application No. 60/748,553, filed on Dec. 7, 2005.

(51) Int. Cl.
*G08B 1/00*    (2006.01)
(52) U.S. Cl. ............. 340/539.2; 340/572.1; 340/539.16
(58) Field of Classification Search ... 340/539.1–539.9, 340/572.1–572.9, 539.11, 539.12, 539.13, 340/539.16
See application file for complete search history.

(56) References Cited

U.S. PATENT DOCUMENTS

| | | | |
|---|---|---|---|
| 7,123,141 B2 * | 10/2006 | Contestabile | 340/539.13 |
| 7,196,621 B2 * | 3/2007 | Kochis | 340/539.13 |
| 7,218,227 B2 * | 5/2007 | Davis et al. | 340/572.1 |
| 2003/0050038 A1 * | 3/2003 | Haave et al. | 455/404 |
| 2007/0126573 A1 * | 6/2007 | Valania | 340/539.13 |

OTHER PUBLICATIONS

Grace Industries, Inc., "In Command" (brochure), all pages published by Grace Industries, Inc. 305 Bend Hill Road, Fredonia, PA 16124, US.

* cited by examiner

*Primary Examiner*—Davetta W Goins
*Assistant Examiner*—Edny Labbees
(74) *Attorney, Agent, or Firm*—Riddle Patent Law; Charles L. Riddle, Esq.

(57) ABSTRACT

A system for tracking, graphically selecting and interacting with people, vehicles and/or equipment ("Mobile Units") employs a tracked device attached to Mobile Unit capable of collecting information relating to the Mobile Unit to which it is attached and for communicating this digital information via radio waves to a base connected to a network. A number of servers are connected to the bases through a hierarchy network and can selectively display the monitored locations graphically. The user may also graphically select Mobile Units with which to communicate and/or control remotely. The system is well adapted for creating a hierarchy structure which can potentially track numerous people, vehicles, equipment across a country or globally.

16 Claims, 6 Drawing Sheets

FIRST RESPONDER LOCALIZATION AND COMMUNICATION SYSTEM

CROSS REFERENCES TO RELATED INVENTIONS

This application claims priority from U.S. Provisional Patent Application "FIRST RESPONDER LOCALIZATION AND COMMUNICATION SYSTEM" by Brian Valenia, Ser. No. 60/748,553 filed Dec. 7, 2005, hereby incorporated by reference as if set forth in its entirely herein.

BACKGROUND OF THE INVENTION

1. Field of the Invention

The present invention relates to a system for graphically tracking people, vehicles and equipment and graphically selecting groups of these with which to interact.

2. Discussion of Related Art

In many emergency situations, the locations of people, vehicles and/or pieces of equipment (collectively, "Mobile Units") must be known. This is especially true of first responders such as firefighters, police and paramedics. Since they must act immediately, and require specialized vehicles and equipment, it is imperative that they know the locations of these Mobile Units. Providing locations and other data using voice description rarely works well in these emergency situations where there is a large amount of 'radio chatter' at the scene.

In events such as the terrorist attacks on Sep. 11, 2001, there was a great deal of radio chatter which blocked all radio channels and did not allow the first responders to communicate with each other.

In addition, sometimes it is necessary to also receive data information from these Mobile Units.

Prior art systems exist for graphically providing the real-time location of vehicles, such as airplanes. These historically were derived from radar images that were overlaid upon maps. Even though these systems provide a graphical method of identifying the location of aircraft, these would not easily convert to a system to track firefighters or other first responders. These would require expensive radar and additional modification to determine the location of Mobile Units.

Prior art cellular telephones now have GPS capability, which will send the location of each unit. These GPS locations are protected information and not published or allowed to be used in other systems. Therefore, these cannot be used to graph the locations of several Mobile Units simultaneously.

In addition to locating first responders, their equipment and receiving data about them, it is also necessary to send information and communicate with several selected responders at the same time while not communicating this information to other responders. This may occur when several responders are close to a dangerous area. The base would like to notify these three quickly to leave, but not to contact the others to reduce "chatter" at the emergency site. There currently is no system which accomplishes this goal.

Currently, there is a need for an intuitive system for tracking mobile units and for easily interacting with selected groups of these Mobile Units.

SUMMARY OF THE INVENTION

One embodiment of the present invention is a tracking and remote interaction system for tracking, selecting and interacting with a plurality of mobile units comprising:

a) a plurality of tracked devices 4100 each attached to a different mobile unit, the tracked device 4100 comprising:
   i. a location device 4113 for monitoring its location and for providing a signal indicating its location;
   ii. a transmitter for receiving the signal from the location device and for transmitting a radio signal to a base 3100;
   iii. a receiver 4120 for receiving radio signals sent to the tracked unit 4100, for decoding the received signals into digital streams and for playing back communication in the digital streams, and for implementing commands in the digital streams;

c) a base 3100 comprising:
   i. a receiver 3120 for receiving the radio signals from the transmitter 4110 of the tracked unit 4100 and for decoding the digital information, including location information, of the tracked device 4100,
   ii. a transmitter 3110 for receiving digital information and for transmitting communications and commands as digital information to selected tracked units 4100;

d) a server 2100 coupled to the base 3100 for receiving the digital stream including the location information from the base comprising:
   i. a map database 2130 having map information of an area of interest surrounding the locations of the tracked units 4100;
   ii. a tracking database 2150 capable of holding location information of a plurality of tracked units 4100;
   iii. an actions database 2170 capable of receiving communications, responses and commands intended to be sent to a tracked unit 4100;
   iv. a processor 2190 coupled to the tracking database 2150 capable of receiving the location information from the base 3100 and storing it in the tracking database 2150, the processor also coupled to the map database 2130 capable of receiving map information from the map database 2130 and displaying a graphical representation of a map; the processor also capable of reading information from the tracking database 2150 and for displaying an overlay indicating the locations of the tracked units 4100 on the graphical display; the processor 2190 also capable of interacting with a user to allow the user to select tracked unit with which to interact and messages, responses and commands intended to be sent to the selected tracked units 4100; the processor 2190 also capable of passing the information in the actions database as a digital stream to transmitter 3110 of base 3100 causing it to be sent to each of the selected tracked units 4100.

The present invention may also be embodied as a method of selecting and remotely interacting with a plurality of mobile units comprising the steps of:

a) tracking the location of a plurality of mobile units;
b) providing the tracked locations to a hierarchical network for storage;
c) selecting a region on interest to display;
d) interacting with the hierarchical network to provide information relating to mobile units in the selected region;
e) graphically representing a map with the mobile units of the selected region;
f) interacting with the user to select mobile units on the graphical representation with which to interact;
g) providing communications to be sent to the selected mobile units, to the base;

h) simultaneously providing the communications to the selected mobile units without sending the communication to other mobile units which were not selected.

OBJECTS OF THE INVENTION

It is an object of the present invention to provide a system for providing tracking the near real-time location of several identified people, equipment and vehicles ("Mobile Units") simultaneously.

It is an object of the present invention to provide a system for providing tracking of the near real-time location of many Mobile Units simultaneously.

It is another object of the present invention to provide a graphical method of tracking, selecting and interacting with a number of Mobile Units simultaneously.

It is another object of the present invention to provide a graphical method of providing a 'snapshot' of selected equipment over a region.

It is another object of the present invention to provide a hierarchical database tracking system.

BRIEF DESCRIPTION OF THE DRAWINGS

The advantages of the instant disclosure will become more apparent when read with the specification and the drawings, wherein.

DETAILED DESCRIPTION OF THE INVENTION

It is a difficult problem to identify the location of equipment, vehicles and personnel ("Mobile Units") quickly during an emergency situation. This is partly due to a large amount of communications on limited channel bandwidth, effectively jamming the channels during the emergency.

It may be necessary to identify all of the Mobile Units, not only locally, but regionally, statewide and nationally. This may be the case in the event that there is a large-scale emergency.

The present invention is aimed at solving the problems described above.

Transceiver units are attached to each of the Mobile Units. These transceivers are capable of transmitting and receiving data to/from a base unit using radio technology similar to existing Global Packet Radio Service (GPRS) technology. This data sent will include the Mobile Unit's location determined from a Global Positioning System (GPS) localization device, the type of Mobile Unit (type of vehicle, type of firefighter, policeman, paramedic, type of equipment) and other useful information.

Information monitored on a tracked first responder is also sent, such as heart rate, respiration rate, temperature, etc.

Information sent for a tracked vehicle could be the capabilities of the vehicle, identification if it is currently being used or is reserved for pickup.

Voice and/or sounds from the tracked Mobile Unit are digitized, compressed and merged into the data then sent to the base.

The base is connected to land lines and the Internet, and/or other data communication networks to share this data with other servers arranged in a hierarchical structure.

Figure 1:
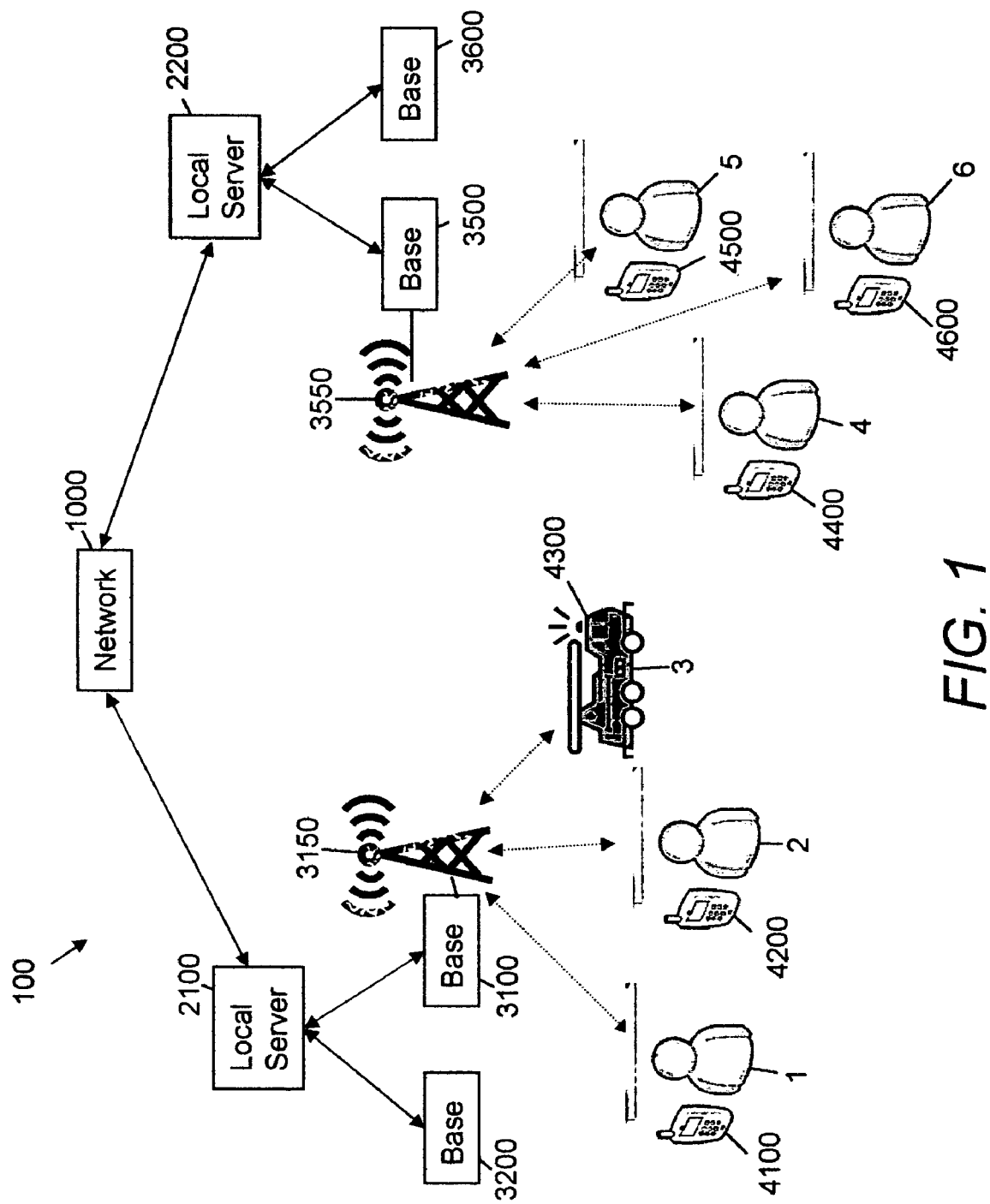
FIG. 1 is perspective overall view of a tracking and interaction system according to one embodiment of the present invention.

A more detailed description of the present invention is provided below in connection with the description of FIG. 1. FIG. 1 is an overall schematic illustration of a tracking and interaction system according to one embodiment of the present invention.

The servers run software that has been designed to receive this information, compile the information, graphically display the information in an understandable way, interact with a user to select different people, vehicles and equipment with which to communicate or control. Each server may be a single device, or a group of coupled devices. These devices may be co-located or located at various remote sites.

FIG. 1 shows a tracking and interaction system 100 according to one embodiment of the present invention. A plurality of users 1, 2, 4, 5, 6, vehicle 3 and/or other equipment ("Mobile Units") are fitted with, or carry tracked units 4100, 4200, 4400, 4500, 4600, 4300, respectively. Tracked units 4100-4600 have the capability of receiving data from devices carried by the Mobile Units, merging it with other data and transmitting it to bases 3100, 3500 through the base antennae 3150, 3550. Since this is a tracking system, data indicating the location of the Mobile Units, determined by appropriate means, such as by a GPS device, are constantly and repeatedly passed back to base 3100, 3500.

Voice, audio, images, video is also be captured and sent as data to base 3100 and 3500. Since simple text and numerical data transmission requires less transmission bandwidth than video or image transmission. Video and images should not be sent when the channel is getting close to saturation.

As stated above, tracked units 4100 may also be built into, or attached to equipment 4 and vehicles 3, allowing them to be interactively tracked.

In addition to constantly sending their locations, information regarding the Mobile Units which is applicable to a current situation may also be sent via the radio data link.

For example, where users 1 and 2 are first responders there is certain information, in addition to their locations, which will be helpful during an emergency situation. They should be identified as a firefighter, policeman, EMT, etc. Also, other more specific information relating to the services that they are capable of performing, and the equipment that they are carrying is also indicated to base 3200.

As stated above, other information relating to the health of the first responder such as heart rate, respiration rate, oxygen level, carbon dioxide level, temperature etc. would be useful. This information will be acquired by monitoring equipment attached to the first responder. This information may be constantly monitored and transmitted to base 3200. This could indicate if the first responder is in trouble.

For vehicles, the identification of this vehicle, its capabilities and equipment should be transmitted to base 3100, 3500. This is useful on a large-scale basis in dispatching vehicles to a scene. Currently, vehicles are dispatched based upon which fire company is responding to an event. It is technically possible to have a fire across the street (in a different fire district) from a firehouse, while a firehouse across the city (but still in the same fire district) responds to the fire.

The present system could instantaneously locate vehicle 3 in the nearby vicinity and dispatch it to the scene. Using conventional path-finding routines and street maps, the estimate travel time could be calculated and communicated to those at the scene indicating when help will arrive.

Figure 2:
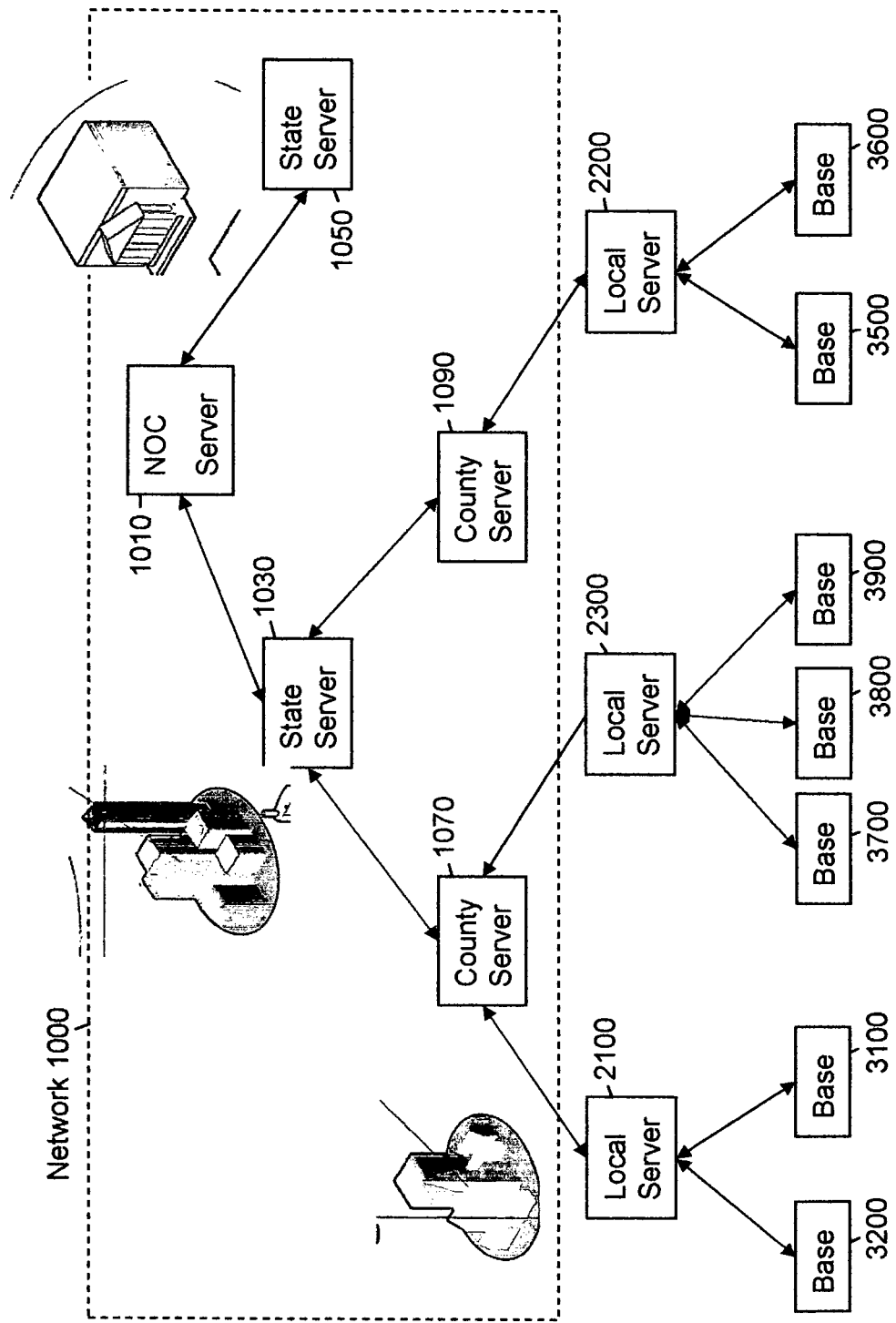
FIG. 2 shows the hierarchical structure of the tracking and interaction system of FIG. 1.

FIG. 2 illustrates how a plurality of bases 3100-3900 report into their local servers 2100, 2200, 2300.

As described above, it is important that these local servers communicate with each other to provide an overall "snapshot" of where the Mobile Units are and what their capabilities are.

Just as the Mobile Units 1-6 communicate with bases 3100, 3500 in FIG. 1, other Mobile Units communicate with their respective bases in FIG. 2 representing different localities. Each of these localities may be municipalities that send their data to local servers 2100, 2200, 2300. (These local servers may also receive data from bases over a group of municipalities.)

Similarly each of the local servers 2100, 2200, 2300 transmit their selected information up to county servers 1070 and 1090 which may be part of a larger network 1000.

County servers 1070 and 1090 across the state report to a state server 1030 which in turn reports to a national operation center ("NOC") 1010.

As each of these units passes information to the next higher level of the hierarchy, certain local information which is not of interest to the higher levels of hierarchy are omitted. For example the health of each first responder is of immediate interest to the lower levels of hierarchy in order to ensure the safety of the first responder. This information is not very useful to those of the state or national level since there's nothing they can do in time to save the first responder.

The previous example described the servers as being grouped by local, county and state, and national divisions, however, any hierarchical structure will also fall under the scope of the present invention.

Not only does the structure allow for local real time information to be distributed in an efficient manner, it can also be used to fulfill government emergency reporting requirements.

Figure 3:
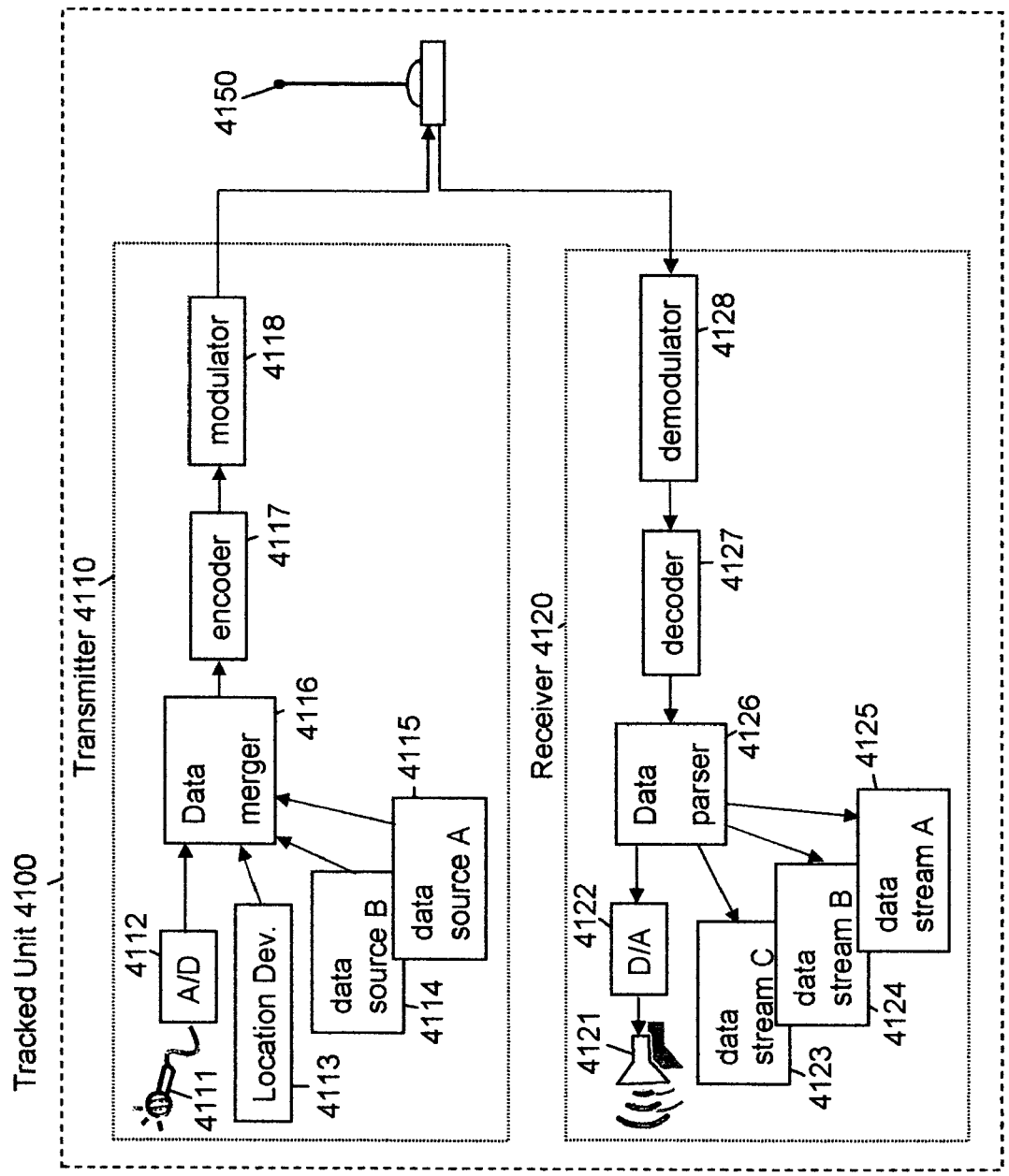
FIG. 3 is a schematic block diagram of a tracked unit according to one embodiment of the present invention.

FIG. 3 is a schematic block diagram illustrating an embodiment of a tracked unit 4100 according to the present invention. Tracked unit 4100 employs a transmitter 4110, a receiver 4120 and an antenna 4150.

Tracked devices 4100 on Mobile Units acquire information monitored on the Mobile Unit, as described above. For example, the respiration rate of a first responder, data source A 4115, is digitized. Other parameters are monitored such as data source B 4114 as well as location device 4113 providing the GPS coordinates of its current location. A microphone 4111 receives audio and speech information which is provided to an analog-to-digital (A/D) converter 4112 which provides the data stream to data merger 4116. Data from the other sources 4113-4115 are also provided to data merger 4116 which are all merged together into a composite signal that is provided to encoder 4117.

Figure 4:
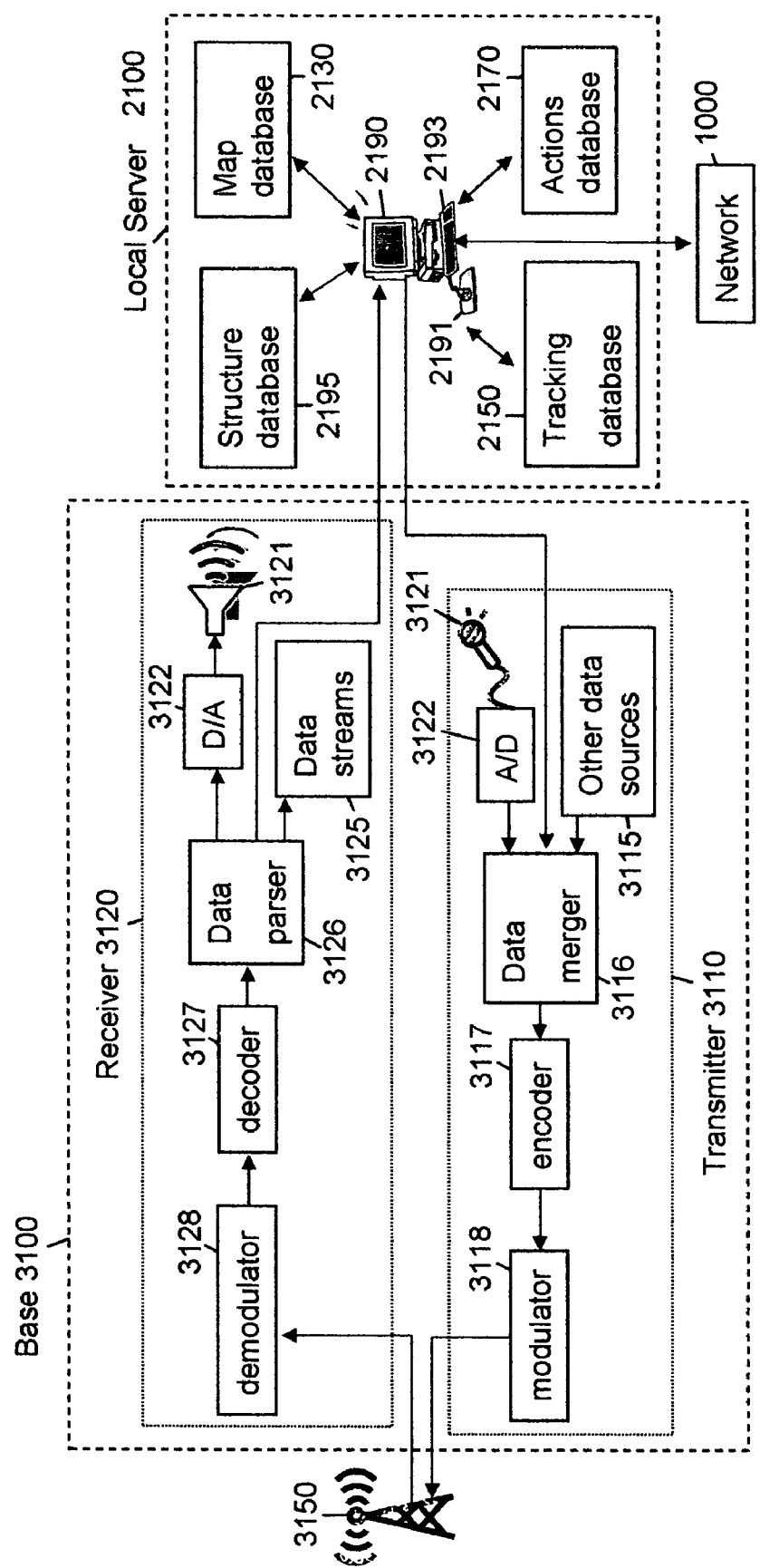
FIG. 4 is a schematic block diagram of a base and local server according to the embodiment of the present invention shown in FIG. 2.

The encoded information is provided to a modulator 4118 which transmits the signal through antenna 4150 to base tower 3150 and to base 3100 of FIG. 4.

FIG. 4 is a schematic block diagram illustrating base 3100 and local server 2100. The signals sent by tracked unit 4100 of FIG. 3 of the Mobile Units are received by base tower 3150 and provided to base 3100. Base 3100 employs a receiver 3120 and a transmitter 3110.

Signals received at base tower 3150 are provided to a demodulator 3128, which demodulates information and provides it to a decoder 3127. Decoder 3127 decodes the data into a composite digital stream provided to data parser 3126. Data parser 3126 splits it into individual data streams. Signals originating from audio and other analog devices are provided to a digital-to-analog (D/A) converter 3122. D/A converter 3122 then provides an analog stream which is played on an analog system such as audio system 3121.

Other data streams 3115 are provided to base 3100 which may be the responses to information previously requested by base 3100.

A data stream is sent from base 3100 to local server 2100. Local server 2100 is connected to network 1000. Local server 2100 and base 3100 pass information in both directions.

Local server 2100 employs a map database 2130 having digitized maps of the areas of interest surrounding the Mobile Units with which it is interacting. Local server 2100 also employs a tracking database 2150. Central processing unit (CPU) 2190 receives and stores the near real-time information relating to the Mobile Units stored in the tracking database 2150. CPU 2190 will repeatedly update tracking database 2150. This information is forwarded on to other servers on network 1000. Local information "bubbles up" to the county 1070, state 1030 and NOC 1010 (FIG. 2) servers, thereby populating tracking databases of each of these with near real-time information.

Therefore, local server 2100 has access to the information regarding tracked units 4100 in FIG. 3 stored in tracking database 2150 and a map information surrounding the locations where the tracked units 4100 are. CPU 2190 displays on a screen 2195 the map information with icons indicating the locations of the Mobile Units. The Mobile Units may be color-coded or use icons of different shapes to indicate their type (firefighter vs. vehicle), may display text information near it providing information relating to the Mobile Unit. A user operating local server 2100 may interact with an input device 2191 and/or a keyboard 2193 to select one more of the icons and to request additional information of the Mobile Unit which may show up on the 'pop-up' screen. The user may interact with local server 2100 by operating input device 2191 and/or a keyboard 2193 to individually select Mobile Units, or to select a region on the map which may include one or more Mobile Units with which to communicate. Users may then communicate with, send information to, or send commands to a group of Mobile Units simultaneously.

Figure 5:
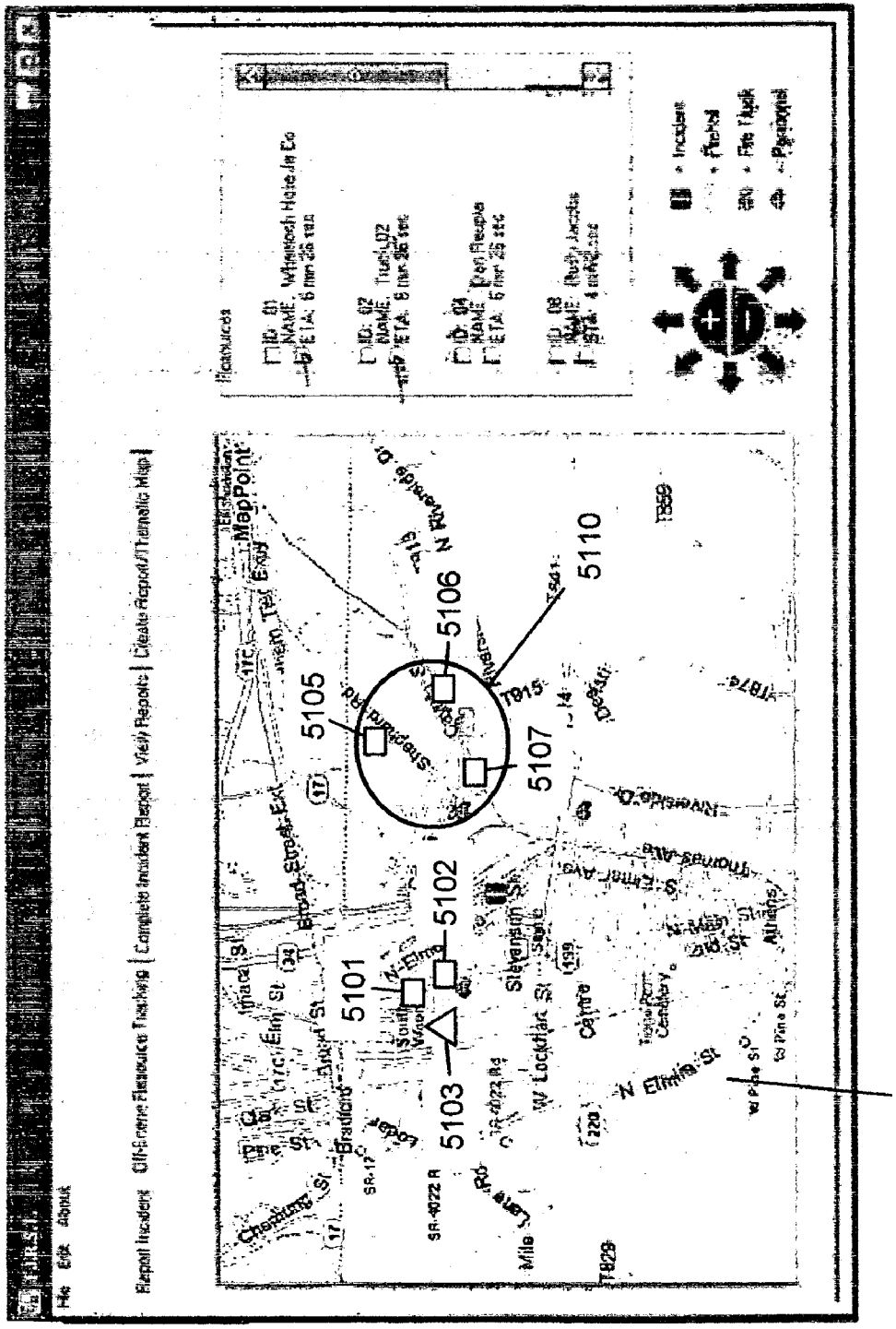
FIG. 5 is an illustration of a 'screen shot' illustrating the functioning of the local server of FIG. 4.

FIG. 5 shows a 'screen shot' of one embodiment of local server 2100 operating to show a map 5100 with overlays of locations of user 1 shown by icon 5101, user 2 shown by icon 5102, and the vehicle 3 shown by icon 5103 at an emergency site. Since CPU 2190 also is a connection to network 1000 and may request that information be downloaded regarding Mobile Units and other locations monitored by other local servers 2200, first responders 5, 6, and 7 may also be localized on this map.

The user interacting with local server 2100 may use input device 2191 to draw a circle 5110 graphically selecting a region and the first responders with which to interact. In this example, first responders 5, 6 and 7 of FIG. 1 illustrated by icons 5105, 5106 and 5107, respectively were selected. Therefore, messages, responses and commands may be selectively sent from server 2100 to first responders 5, 6 and 7 simultaneously without sending the message to first responders 1, 2 and vehicles 3. The user has selected first responders 5, 6, 7 to notify them that first responders 1, 2 are in need of help and should immediately assist first responders 1 and 2 in fighting a fire. Since first responders 1 and 2 are currently battling the blaze, their considerable level of 'chatter' and the present invention operates to prevent additional chatter from being sent to first responders 1, 2, while allowing necessary communication with first responders 5, 6, 7.

Local server 2100 passes commands and other information back to the Mobile Units. These commands may activate and deactivate or adjust parameters of selected equipment and systems. local server 2100 may provide some limited remote control functions which may be required during an emergency. For example, if the carbon dioxide levels within the breathing apparatus of a first responder get too high, the oxygen mixture may be adjusted by the base 3100 remotely by selecting this Mobile Unit and by sending the proper command. These actions, responses and commands are stored in an actions database 2170 which is accessible by the CPU 2190.

In FIG. 4, when it is time for local server 2100 to respond back to Mobile Units, responses, commands and actions stored in 2170, along with an identification of the Mobile Units identified to receive information are sent back to a data merged device 3116 a transmitter 3110 of base 3100. At base 3100 audio information may be acquired with a microphone 3121 which is converted to a digital stream by A/D converter 3112 and passes a digital stream to data merger 3116.

Other data sources 3115 may also be merged into the data stream by data merger 3116. A composite data stream produced by data merger 3116 is provided to encoder 3117. It is then modulated by a modulator 3118 and transmitted through base tower 3150 to antenna 4150 of FIG. 3 on the Mobile Units.

In FIG. 3, now the reverse process takes place in receiver 4120 of tracked unit 4100. The signal sensed at antenna 4150 is provided to a demodulator 4128 to bring it down to a base band signal. The base band signal is decoded by a decoder 4127 into a composite data stream which is passed to the data parser 4126. Data parser 4126 then splits the composite data stream into individual data streams A, B, C being 4125, 4124, 4123, respectively.

Any data streams which originated from analog devices are passed to a D/A converter 4122 then played by the appropriate analog device. In this example, an audio speaker to produce speech and audible sounds.

In FIG. 4, local server 2100 may also act to acquire information required to be reported during an emergency in an automated fashion. Since a local server 2100 is in communication with the remainder of network 1000, and may provide any information necessary for reporting requirements on the county, state or national level interactively and in near real-time.

Currently, this reporting information is done manually with a pen and paper and faxed or mailed to the appropriate authorities. The present invention is a huge advancement in this nature.

Figure 6:
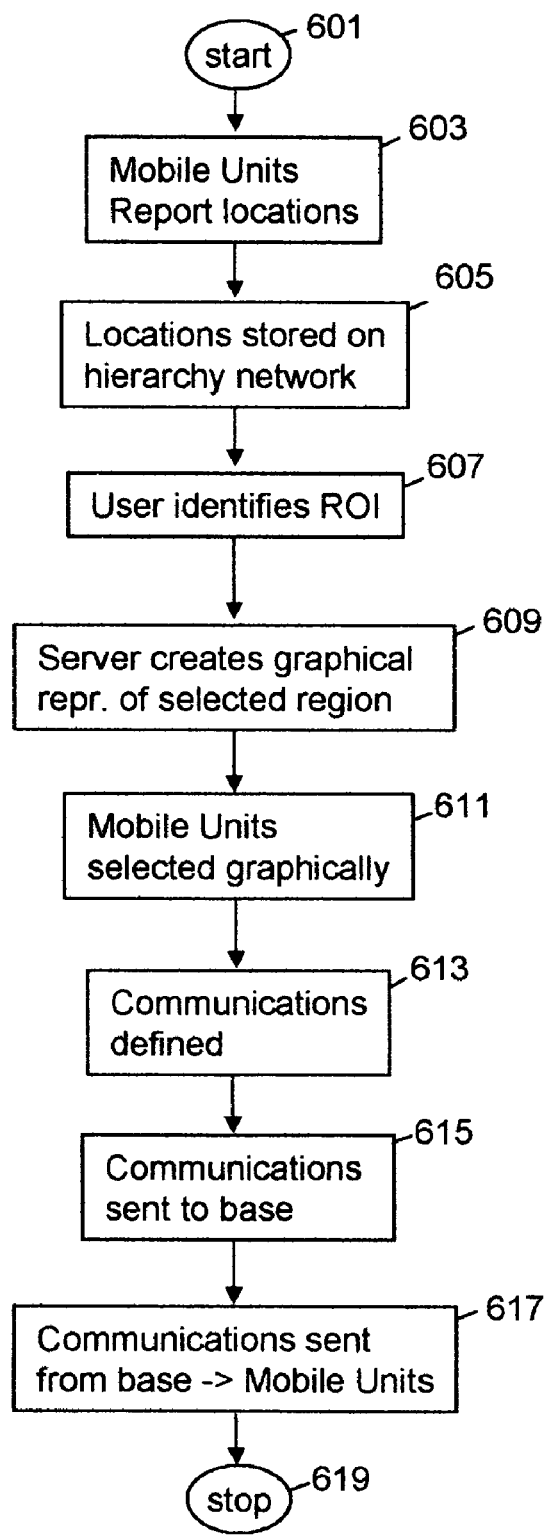
FIG. 6 is a flowchart diagram illustrating the operation of the embodiment of the present invention shown in FIGS. 1-5.

FIG. 6 is a flowchart diagram illustrating the operation of the embodiment of the present invention shown in FIGS. 1-5.

The process starts at step 601.

In step 603 each the Mobile Units report their digitized locations to at least one base.

In step 605, locations sent to the base are provided to at least one server of a hierarchical network.

In step 607, a user located at a remote location relative to the Mobile Units identifies a region-of-interest (ROI) which the user would like to view.

In step 609, the locations of the Mobile Users are received from the hierarchical network and graphically represented to the user at one of the servers on an interactive map or similar display.

In step 611 the server interacts with the user to select Mobile Units on the graphical representation with which to interact.

In step 613, the user defines communications to be sent to the selected Mobile Units at the server.

In step 615, the server provides the defined communications to be sent to the selected Mobile Units, to the base;

In step 617, the base sends the defined communications to the selected Mobile Units without sending the communication to other mobile units which have not been selected.

The process ends at step 619.

Since this tracking and communications system according to the present invention has various uses, a few other uses which fall in the scope of the present invention will be described here in detail. For example, it is necessary to know the location of prisoners under house arrest. House arrest prisoners are only allowed to travel to certain locations and stay within a defined perimeter. The present invention may be embodied as a bracelet around the prisoner's ankle having the GPS and communications capabilities. The system will track the ankle bracelet and will be able to give a graphic representation of the locations of all of these prisoners simultaneously. Authorities using this system can graphically select those which are close to their perimeter and give them warning messages so that they are not in violation of the rules of house arrest (potential Contempt of Court).

The ankle bracelet may be designed with a remotely operated lock. The Authorities may employ the system to graphically select the prisoner who is to be released from House Arrest, and remotely communicate with the ankle bracelet of the prisoner to cause it to release, freeing the prisoner.

The present invention is useful in tracking equipment used at several locations or several different groups of people. For example, the present invention may be useful in locating mobile dialysis machines, or mobile x-ray machines in large hospitals. These machines are typically wheeled to various departments of the hospital for use. It is difficult to locate these when necessary in large hospitals due to their constant mobility. The present invention can easily give one a 'snapshot' of where everyone is. They also can send additional data indicating if they need servicing, need to be refilled with supplies, or are currently reserved for use.

Using the graphics display, one could select one and put a 'hold' on it, which will be indicated by a light on the machine and an icon on the graphics screen showing that this machine is reserved and that someone is coming to pick it up.

Since other modifications and changes varied to fit particular operating requirements and environments will be apparent to those skilled in the art, the invention is not considered limited to the examples chosen for the purposes of disclosure, and covers all changes and modifications which do not constitute departures from the true spirit and scope of this invention.

What is claimed is:

1. A tracking and remote interaction system [100] for tracking, selecting and interacting with a plurality of mobile units comprising:
   a) a plurality of tracked units [4100] each attached to a different mobile unit, the tracked units [4100] comprising:
      i. a location device [4113] for monitoring its location and for providing a signal indicating its location;
      ii. a microphone [4111] and an analog-to-digital (A/D) converter [4112] for providing a data stream;
      iii. a data merger [4116] for merging the signal from the location device [4113] and the data stream from the analog-to-digital (A/D) converter [4112] to provide a composite signal;

iv. a modulator [4118] for passing the composite signal from the location device and for transmitting a radio signal to a base [3100];

v. a receiver [4120] for receiving radio signals sent to the tracked unit [4100], for decoding the received signals into digital streams and for playing back communication in the digital streams, and for implementing commands in the digital streams;

c) a base [3100] comprising:

i. a receiver [3120] including a demodulator [3128], a decoder [3127], and a data parser [3126], for receiving the radio signals from the tracked unit [4100], for demodulating, decoding, and parsing the radio signal to provide information including location information, and voice communications of the tracked unit [4100], ii. a transmitter [3110] for receiving digital information and for transmitting voice communications and commands as digital information to selected tracked units [4100] through an antenna [3150];

d) a server [2100] coupled to the base [3100] for receiving the digital stream including the location information from the base comprising:

i. a map database [2130] having map information of an area of interest surrounding the locations of the tracked units [4100];

ii. a tracking database [2150] capable of holding location information of a plurality of tracked units [4100];

iii. an actions database [2170] capable of receiving communications, responses and commands intended to be sent to a tracked unit [4100];

iv. a processor [2190] coupled to the tracking database [2150] capable of receiving the location information from the base [3100] and storing it in the tracking database [2150], the processor [2190] also coupled to the map database [2130] capable of receiving map information from the map database [2130] and displaying a graphical representation of a map; the processor [2190] also capable of reading information from the tracking database [2150] and for displaying an overlay indicating the locations of the tracked units [4100] on a graphical display; the processor [2190] also capable of interacting with a user to allow the user to select tracked unit [4100] with which to interact to send messages and commands, and receive responses; the processor [2190] also capable of passing the information in the actions database [2170] as a digital stream to transmitter [3110] of base [3100] causing it to be sent to each of the selected tracked units [4100].

2. The tracking and remote interaction system [100] of claim 1, wherein the location device [4113] is a global positioning device.

3. The tracking and remote interaction system [100] of claim 1, wherein the mobile units are first responders.

4. The tracking and remote interaction system [100] of claim 1, wherein the mobile units are vehicles.

5. The tracking and remote interaction system [100] of claim 1, wherein the mobile units are pieces of equipment.

6. The tracking and remote interaction system [100] of claim 1, wherein the communications are voice communications.

7. The tracking and remote interaction system [100] of claim 1, wherein the communications are commands.

8. The tracking and remote interaction system [100] of claim 1, wherein the communications are commands to alter the life-support controls of a first responder.

9. A method of selecting and remotely interacting with a plurality of mobile units comprising the steps of:

a) tracking the location [603] of a plurality of mobile units;

b) providing the tracked locations [605] to a hierarchical network for storage;

c) selecting a region on interest [607] to display;

d) interacting with the hierarchical network to provide information relating to mobile units in the selected region;

e) graphically representing a map [609] with the mobile units of the selected region;

f) interacting with the user [611] to allow the user to select mobile units on the graphical representation with which to interact;

g) providing communications [613] to be sent to the selected mobile units, to the base;

h) simultaneously providing the communications to the selected mobile units [617] without sending the communication to other mobile units which were not selected.

10. The method of selecting and remotely interacting of claim 9, wherein the location is tracked using global positioning technology.

11. The method of selecting and remotely interacting of claim 9, wherein the mobile units are first responders.

12. The method of selecting and remotely interacting of claim 9, wherein the mobile units are vehicles.

13. The method of selecting and remotely interacting of claim 9, wherein the mobile units are pieces of equipment.

14. The method of selecting and remotely interacting of claim 9, wherein the communications are voice communications.

15. The method of selecting and remotely interacting of claim 9, wherein the communications are commands.

16. The method of selecting and remotely interacting of claim 9, wherein the communications are commands to alter the life-support controls of a first responder.

* * * * *